Nov. 15, 1949     D. STEINHAUS     2,488,146
OPTICAL PROJECTION COMPARATOR WITH PROJECTED
STANDARD SCALES AND TEMPLETS THEREFOR
Filed Nov. 29, 1944
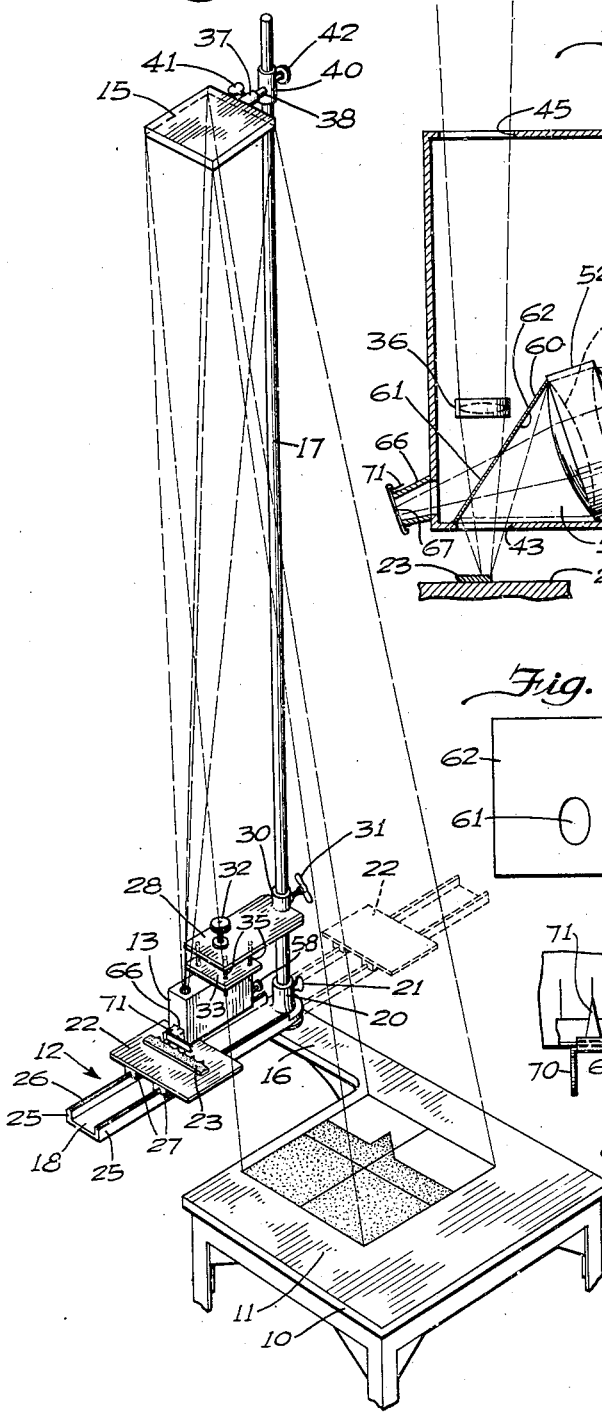
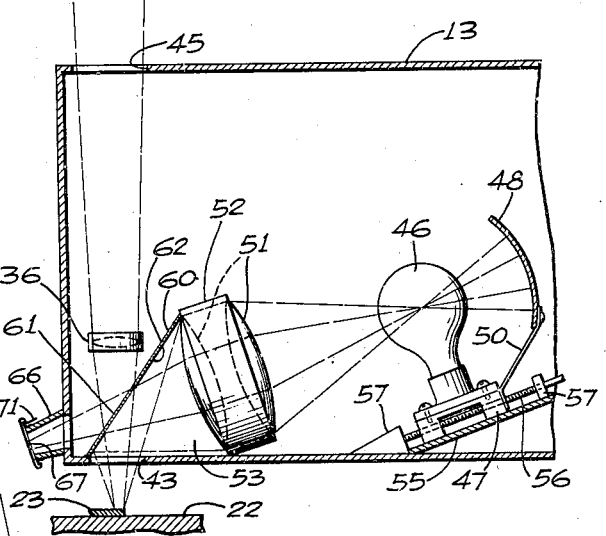
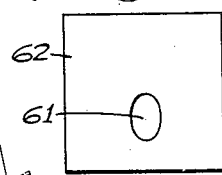
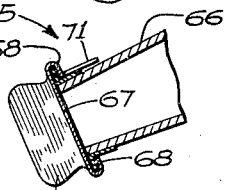
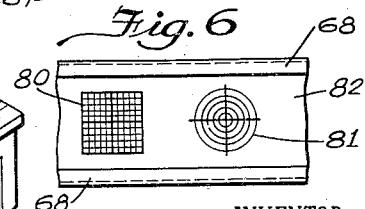
INVENTOR.
David Steinhaus
BY
Mann and Brown
Att'ys.

Patented Nov. 15, 1949

2,488,146

UNITED STATES PATENT OFFICE 2,488,146

OPTICAL PROJECTION COMPARATOR WITH PROJECTED STANDARD SCALES AND TEMPLETS THEREFOR

David Steinhaus, Lake Forest, Ill., assignor to Central Scientific Company, a corporation of Illinois Application November 29, 1944, Serial No. 565,631

4 Claims. (Cl. 88—24)

My invention relates to optical devices such as comparators and the like for producing highly magnified images by means of which small objects or small areas of objects may be conveniently and accurately inspected, or measured, or compared with different criteria such as standard templets or the like.

Devices of the prevailing type now in commercial use (which are both bulky and expensive) produce the magnified image on a translucent viewing screen of ground glass or the like, the image being projected on the opposite side of the screen from the observer. The viewing screen of such devices is usually vertical or at least greatly inclined from the horizontal so that the image is not viewed in the same aspect or orientation as the object under inspection.

One of the most serious disadvantages of projecting an image on the reverse side of a translucent screen is that any opaque object, such as a templet placed against the observer's side of the screen, acts as a mask to blank out corresponding portions of the image. Transparent or translucent templets may be employed but are relatively expensive and more often than not are made of material that is either stretchable or temperature-responsive to such degree as to preclude accuracy. If paper is employed for making a tracing of the projected image, the paper must be relatively thin tissue to make the image visible and, moreover, since the projection screen is either vertical or inclined at an angle, the paper must be held in position for the tracing operation. Thin paper changes dimensions with change in weather. Relatively heavy opaque paper or cardboard as distinguished from thin tissue is not subject to distortion or shrinkage and may be relied upon for accuracy over a period of time under diverse conditions but opaque material cannot be used for tracing images on a translucent screen.

One group of objects of my invention relates to the attainment of high utility, namely: to provide full information about a surface in one inspection; to produce an image on a surface that is horizontal or sufficiently close to horizontal so that a templet or any other comparing or measuring means may be placed thereon and retained by gravity alone without the necessity for any holding means; to provide a magnified image that is adjacent to the object under inspection; to provide a projection system that will permit the use of heavy opaque templets and tolerance rings drawn on heavy opaque material for permanent accuracy; to provide for projection of the image from the viewer's side of the projection surface, whereby the magnified image may be traced on heavy opaque paper; to provide such a device that may be adapted with no loss in time for surface projection or profile projection or combined surface and profile projection; and to provide an optical projector that may be employed not only for inspecting the surfaces or profiles of small objects but also may be applied to the surface inspection of exceedingly large objects, such as huge castings or finished machines.

A second group of objects of my invention relates to the heretofore troublesome problem of satisfactorily illuminating an object under optical inspection, such objects including: to uniformly illuminate the item under inspection with consequent uniformity in the magnified image; to achieve "shadowless" illumination whereby all surface irregularities are lighted uniformly with no misleading emphasis or shadows and whereby an object to be inspected may be placed in any position with respect to the direction of scratches and machining marks thereon; to provide a system of illumination for both opaque and shadow projection, i. e., surface inspection or profile inspection; to produce by simple means a projected large scale image that is strongly lighted, sharply defined and highly accurate; to provide a converging illuminating light beam within the light-transmitting space of an optical system for direct reflection back into the optical system, which beam is focused independently of the optical system; and to provide an illumination system so efficient that a single inexpensive and widely available lamp bulb, such as an automobile headlight bulb, may be used to afford a degree of surface illumination heretofore attainable only by more elaborate and more costly lighting arrangements.

A third group of objects relates to the structural features of an optical projector. Among these objects are: to provide an inexpensive, lightweight, simple optical projector; to provide a simple but highly efficient means for reflecting illuminating light into a magnifying optical system without limiting the area of the reflecting surface to cross-sectional dimensions of the optical system; and to provide a micro-projector, all of the structure of which lies on one side of the focal plane of a surface under inspection, whereby any amount of space desired may be afforded on the opposite side of the focal plane for occupancy by large objects under inspection.

In general and briefly stated, these objects are attained by providing a relatively simple optical system including a lens and a mirror for projecting the image of an object by reflected light and combining with such optical system a simple illuminating system for lighting up the object, the latter system including a means that is both light-reflective and light-transmissive for positioning across the optical axis of the first system.

A further purpose of my invention is to provide means for measuring distances on an object by measuring corresponding distances on a magnified image of the object without introducing error by distortion in the magnification, even when such distortion exists. This purpose is attained by an arrangement whereby an image of a scale or other measuring means is reflected into the optical system for magnification thereby.

The above and other objects and advantages of my invention will be readily apparent in the following detailed description taken with the accompanying drawings.

In the drawings, which are to be regarded as illustrative only:

Figure 1 is a perspective view of a preferred form of my invention,

Figure 2 is a fragmentary sectional view of a light box employed in Figure 1,

Figure 3 is a face view of an optical plate having an important function in the invention, Figure 4 is an enlarged detail of Figure 2, Figure 5 is a fragmentary view taken as indicated by the arrow 5 in Figure 4, and Figure 6 is a fragmentary face view of a scale means in Figure 2.

The principal parts of the preferred form of my invention shown in the drawings include a suitable table or stand 10 providing a horizontal or nearly horizontal surface 11 to receive the projected image, a stage assembly generally designated 12 to hold small objects for inspection, a light box 13 for illuminating the image and an optical system including an elevated mirror 15 for producing the magnified image. For the sake of precision, the surface 11 may be normal to the axis of the light reflected from the mirror 15 and therefore slightly tilted from a strictly horizontal plane. Such slight tilting is to be understood as being within the scope of "substantially horizontal" as used in the appended claims. The table 10 may be of any desirable construction and the remaining principal parts of the apparatus may be structurally related thereto in any suitable manner. In the illustrated arrangement, the table is of exceptionally sturdy construction and includes a support arm 16 extending laterally near its rear edge to carry an upright standard 17, the stage assembly, light box and elevated mirror being mounted on this standard.

The particular stage assembly shown in Figure 1 comprises a base member 18 having an integral collar 20 rotatably embracing the standard 17, the collar being provided with a thumb screw 21 for releasably securing the base member in the position shown. Preferably, a stage 22 to support an object for inspection, such as the small object 23, is mounted on the base member 18 for accurately rectilinear movement since some problems of inspection and adjustment by a comparator may be performed in a simple but accurate manner if such movement is provided. To this end the base member 18 is formed with two parallel ribs 25 having upper edges 26 of V-shaped configuration and the stage 22 has guide blocks 27 unitary therewith on its under surface, the guide blocks having V-shaped grooves that slidingly fit the rib edges 26. In the preferred practice of my invention, provision is made for resting objects that are to be inspected on a reflective surface and to this end the stage 22 may comprise an ordinary mirror or provision may be made for using reflecting and non-reflecting stages 22 interchangeably.

The light box 13 may be adjustably mounted on the standard 17, for example by means of a support plate 28 having an integral collar 30 slidingly embracing the standard, there being a suitable manually operable screw 31 for fixing the position of the support plate. The support plate 28 is provided with a manually adjustable screw 32 to support the light box 13 from the support plate in a vertically adjustable manner. Unitary with the top of the light box 13 is a suitable guide plate 33 apertured to slidingly receive a plurality of guide pins 35 that extend downwardly from the support plate.

As indicated in Figure 2, the light box 13 supports therein a lens 36 comprising part of the optical system for projecting the image on the table 10, the lens directing light onto the elevated mirror 15 for reflection onto the table. To permit adjustment in the direction of such reflection, the elevated mirror 15 is rotatable about a horizontal axis by virtue of an integral sleeve 37 embracing a radial pin 38 and is adjustable about a vertical axis by virtue of a collar 40 that carries the radial pin and embraces the standard 17, there being a thumb screw 41 to releasably fix the rotary position of the sleeve 37 and a thumb screw 42 to likewise fix the position of the collar 40 on the standard.

The axis of this optical system for projecting an image extends through an opening 43 in the bottom of the light box 13 and a second opening 45 in the upper wall of the light box. The focal plane of the lens 36, that is, the plane at which surfaces of objects on the stage 22 are to be inspected, lies below the light box 13, there being substantial working clearance between the surface of the stage and the bottom of the light box.

In the initial embodiment of the invention, the lens 36 is an f/3.8 lens, 10 mm. in diameter, having a focal length of 38 mm. The resultant image on the projection surface 11 represents a magnification of approximately 100.

Mounted in the light box 13 is a suitable arrangement for projecting a beam of light towards the axis of the described optical system. For example, as shown in Figure 2, a suitable lamp 46 is mounted on a base 47 and provided with a curved reflector 48, the reflector being supported from the base by an arm 50. Between the lamp and the axis of the magnifying optical system is a pair of condensing lenses 51 in a cylindrical lens holder 52, the lamp, reflector and condensing lenses cooperating to produce a converging beam of light 53 directed to intersect the axis of the magnifying optical system. For this purpose, the lamp may be a 50 candle power lamp of the type commonly employed in automobile headlights and the two lenses 51 may be 36 mm. in diameter with focal lengths of 50 mm. to give a combined focal length of 25 mm., the two lenses being placed close together, say with only 12 mm. spacing. Preferably, the lamp 46 together with the reflector 48 is adjustable along the axis of the two condensing lenses 51 and for this purpose the base 47 for the lamp and reflector is slidingly mounted on an inclined plate 55 parallel to the axis of the two condensing lenses. In the particular arrangement shown, a worm 56 journalled in two bearings 57 is in screw-threaded engagement with the lamp base 47 and is controlled by a knurled head 58 outside the lamp box so that rotation of the knurled head shifts the lamp and reflector towards and away from the two condensing lenses.

Intersecting both the axis of the magnifying optical system and the converging light beam 53 is an inclined transparent body or plate having a reflecting surface cutting the inner portion of the converging light beam and preferably there is in addition an adjacent opaque highly reflective means to intersect the outer portions of the converging beam. These two means may comprise a single plate 60 of glass or other suitable transparent material, as shown in Figure 3, the glass having a central clear area 61 to cut the central portion of the converging beam 53, the surrounding area of the glass plate having a coat 62 of light-reflecting material. In the particular construction shown, the light-reflecting coat 62 is a layer of aluminum deposited on the face of the plate 60 that receives the converging beam 53.

In the central portion of the converging beam 53, approximately 1% of the light is lost by absorption on the part of the clear glass; 88% is lost by transmission through the glass towards the wall 63 of the light box and only the remaining 11% of the converging light is reflected downward through the lower box opening 43 towards the stage 22. Again, light passing upward from the stage through the magnifying optical system is subject to loss since 1% is absorbed and 11% is reflected out of the optical system, leaving 88% to pass through the clear area of the glass plate 60 into the lens 36.

On first thought, it would seem that such subtractions would leave too little light for an acceptable image. It is to be noted, however, that the light employed in this manner is directly reflected into the magnifying optical system symmetrically with respect to the axis of the optical system and at low angles relative to the axis of the optical system. Such illumination is so highly efficient as to produce a clear luminous image on the projection surface 11. In other words, relatively weak light approaching the stage 22 at low angles relative to the optical axis and directly reflected into the magnifying optical system at correspondingly low angles relative to the optical axis is more effective by far than diffused light caused by illuminating the focal plane at greater angles relative to the optical axis.

The outer portion of the converging beam 53 which is annular in cross sectional configuration strikes the aluminum coating 62 on the glass plate 60 and is reflected with substantially no loss towards the stage 22. It is apparent that the clear glass in the center of the plate 60 together with the surrounding aluminum areas simply bend the converging beam 53 without changing its converging configuration.

The manner in which the described apparatus may be employed will be readily understood from the foregoing description. If a small object 23 is to be inspected, the object is placed on the stage 22, as indicated in Figures 1 and 2. If the surface of the object is to be examined, the screw 32 is manipulated to raise or lower the stage 22 to bring the surface of the object 23 into the focal plane or field of focus of the magnifying optical system. I have found that optimum uniform illumination of objects under inspection is produced by placing the focus of the downwardly reflected converging beam 53 slightly below the focal plane of the lens 36 of the magnifying optical system, and, moreover, that such a relationship is less critical in adjustment than other relationships.

Since the surface of the object 23 is illuminated from an infinite number of radial directions with respect to the axis of the magnifying optical system, the surface illumination is uniform so that "opaque" projection is achieved without misleading shadows. The efficiency of illumination is so high that the light from a headlight bulb will produce adequately illuminated images of most surfaces in inspection practice including relatively dull unmachined metal surfaces.

If shadow or profile projection is desired, it is merely necessary that the stage 22 be a mirror. Since the light falling upon the unmasked portions of such a mirror stage from the central clear area of the glass plate 60 is reflected upwardly into the magnifying optical system with no appreciable loss, whereas a substantial portion of the light falling on an object 23 is inevitably absorbed by the relatively dull surface of the object, the profile of the object stands out in sharp contrast. An object may be inspected simultaneously with respect to its surface and with respect to its profile. If a small area on the surface of a relatively large object such as a casting is to be inspected, it is merely necessary to swing the stage assembly 12 out of the way, as indicated in dotted lines in Figure 1, and then to position the large object under the light box 13 with the desired surface of the object at the focal plane of the magnifying optical system. Since none of the structure of the described micro-projector extends below the focal plane of the magnifying optical system, there is no limit to the size of an object that may be inspected.

I am aware that the use of an inclined plate of transparent material for the purpose of illuminating an object in the focal plane of an optical system has been suggested heretofore. Such inclined reflecting plates, however, are usually so placed as to reflect light through at least one lens of the optical system. There are two serious disadvantages of such a prior art arrangement. In the first place, the reflecting surface of the inclined transparent plate must lie within the light pattern of the optical system and cannot exceed the boundaries set by the lens through which the light is reflected. In the second place, the reflected light beam is focused by the lens of the optical system so that the focal planes of both the optical system and the light beam must coincide, there being no possibility of separating the two in the desirable manner set forth above.

To avoid these disadvantages, a further suggestion heretofore advanced is to employ an inclined plate greater in area than the cross section of the optical system and to use some auxiliary means including a lens or a reflector to bring all of the reflected light into the dimensions of the optical system for illuminating the object under inspection; but such an auxiliary means presents additional problems and incurs loss in the illuminating beam.

It will be noted that the present invention overcomes these disadvantages in a superior manner without resort to any auxiliary lens or reflector, the new solution being to place the inclined glass plate between the lens means of the optical system and the focal plane of the optical system so that the focusing of the reflected illuminating beam is not affected by the optical system and to employ an illuminating beam that is convergent to whatever degree is required for focusing or for optimum illumination.

A further feature of the preferred practice of my invention is the concept of employing the inclined glass plate 60 for the additional purpose of producing an image of a measuring scale or some other standard of comparison. The importance of this additional feature is not merely in the convenience afforded but also in the accuracy that may be attained. It is well-known that the most carefully ground lens produces some degree of distortion and, of course, the distortion is accentuated by high magnification. Magnifying a ruler or other comparison means along with the object under inspection avoids errors arising from such distortion since the distortion in the image of the comparison means compensates for distortion of the image of the object. On the other hand, using a scale or other comparison means adjacent the object under inspection requires careful manipulation to adjust a comparison means in the field of inspection, and moreover, the comparison means necessarily masks out a substantial portion of the field of inspection. In the new arrangement now to be described, the ruler, scale or like comparison means is employed in such manner as to avoid masking any portion of the inspection field.

The lower end of the light box 13 is provided with an extension 66, the outer end of which is closed by an adjustable slide or comparison means 67. In the particular construction best shown in Figure 4, the outer end of the light box extension 66 is provided with upper and lower horizontal guide flanges 68. The slide 67 is made of suitable sheet metal bent for sliding engagement with the guide flanges 68 and is provided with a suitable handle 70 for manual adjustment. Preferably the slide 67 carries an index means in the form of pointer 71, there being suitable index marks 72 on the adjacent exterior surface of the light box extension 66 so that the pointer may be registered with different marks to bring the slide to different predetermined positions.

The inner face of the slide 67 is at the focal plane of the lens 36 with respect to light reflected into the optical system by the upper surface of the clear portion 61 of the glass plate 60. It is apparent that any lines drawn on the inner face of the slide 67 will produce a second and relatively faint image on the horizontal projection surface 11, the second image being superimposed on the image of the object under inspection. The field of vision at the focal plane of the optical system is necessarily small, say on the order of $\frac{1}{32}$ inch in diameter, and it is possible to place several different scales on the inner face of the slide 67 to be used selectively. Figure 5 representing a portion of the inner face of the slide member shows a scale 80 of rectangular coordinates and a second scale 81 of concentric circles. The lines of these scales may be spaced $\frac{1}{1000}$ of an inch apart. When no image of a scale is desired, the slide 67 is shifted to place a blank portion 82 of the slide at the station of reflection into the optical system. The index means 71 serves as a guide for adjustment of the slide. The inner surface of the slide is finished in dull black to absorb all light except for the scale marks.

While the described apparatus is the preferred form of my invention, certain changes may be made in various practices of the invention. For example, the plate 60 may be a plain piece of glass with no aluminum coating. Or again, the glass plate 60 may be only "half-aluminized," the aluminum coating being so thin as to transmit approximately half the light. Such a reflecting plate is suitable for shadow or profile projection. For opaque projection to reveal the character of surfaces, the central portion 61 of the plate 60 may be cut away, that is to say, the plate 60 may have a central aperture to clear the light rays of the magnifying optical system, the remaining portion of the plate 60 being covered with the aluminum coating 62. Such an apertured mirror is superior to other prior art mirror arrangements because it illuminates objects under inspection from all radial directions uniformly. Other modifications and substitutions occurring to those skilled in the art may be employed within the scope of the appended claims.

It is particularly noteworthy that with a source of light of from 25 to 50 candle power, it is possible with my invention to obtain good opaque projection of a dull, unmachined metal surface with a magnification of as much as 100. Heretofore it has not been possible to obtain anything like this magnification with the same brightness of the light source. As a result of this improved efficiency, it is possible to make metallographic examinations of surfaces which heretofore have been necessarily done with much more complicated and expensive apparatus.

I claim:

1. In a device of the character described, an optical system including lens means for producing on a projection plane an enlarged image of an object located at a focal plane of the system, means to direct a beam of light in a direction to intersect said system between said lens means and said focal plane, light-reflecting means positioned in the path of said beam in a plane across the axis of said system to reflect at least a portion of the beam toward said focal plane for illuminating said object, the area of said light-reflecting means intersected by said beam of light extending outside the paths of light of said optical system to present a relatively large area for reflecting a relatively large amount of light, said beam of light being convergent as its intersection with said light-reflecting means whereby the reflected beam is reduced to a cross section at said focal plane comparable to the field of vision of the optical system at the focal plane, and means to produce a reference image on said projection plane for comparison with said enlarged image, said last means including a comparison object located on the path of said beam of light on the opposite side of said reflecting means from the source of the beam.

2. In a device of the class described for projecting upon a screen or other surface an enlarged image of an object located at one of two focal planes of an optical system, the combination of a light source, an inclined plate having a portion thereof that is both light transmitting and light reflecting and which intersects the axis of said optical system between the object lens of the system and the object, means for directing light from said source upon said portion of the plate at an angle of incidence such that the object will be illuminated by light waves reflected from said portion of the plate in paths that are substantially parallel to the axis of said optical system, and the light rays thus illuminating the object will be reflected from the object back upon themselves and into said optical system, whereby the light entering the optical system is in large measure reflected light rather than diffused light, and a comparison object located at the other of said two focal planes, illuminated from said light source by light rays passing through said portion of the inclined plate and then reflected back into the optical system for superimposing the image of the comparison object upon the first object at the projection plane.

3. In a device of the class described for projecting superimposed enlarged images of a first object lying in a substantially horizontal plane and a second object lying in a substantially vertical plane upon a substantially horizontal projection surface, said device comprising a light source located above and at one side of said first object, an inclined plate having a portion thereof that is both light transmitting and light reflecting and located directly above said first object, means for forming the light from the source into a beam directed at least in part upon said light transmitting and light reflecting portion of the inclined plate, whereby the first object is illuminated by light reflected downwardly from said portion of the plate, and the second object is illuminated by light transmitted through said portion of the plate, and whereby the incident rays striking the first object are reflected back upon themselves upwardly through said portion of the plate, and the incident rays striking the second object are reflected back upon themselves for reflection upwardly by said portion of the plate, and an optical system having all lens components thereof on the side of said plate remote from both objects for projecting enlarged superimposed images of the objects as viewed through said portion of the plate onto said substantially horizontal projection surface.

4. In a device of the class described for projecting an enlarged image of an object upon a projection surface, the combination of a base having a substantially horizontal projection surface thereon and a standard rising therefrom, a stage assembly mounted on the standard for adjustably supporting an object to be examined, a light box supported on the standard over the object and adjustable vertically to and from the object, said light box having vertically aligned openings directly over the object, a light source in the box, an inclined plate in the box having a light transmitting and light reflecting portion along the axis of said aligned openings and being inclined to an angle such that light rays from the light source are reflected downwardly through the lower box opening to the object, then reflected back upon themselves upwardly through said portion of the plate and through the top box opening, and an optical system for projecting an image of the object as viewed downwardly through said portion of the plate, said system having all lens components thereof on the side of the plate remote from the object, and including a lens mounted in the box between the plate and the top opening in the box, and a mirror mounted upon the standard for projecting the image on to said projection surface on the base.

DAVID STEINHAUS.

REFERENCES CITED

The following references are of record in the file of this patent:

UNITED STATES PATENTS

| Number | Name | Date |
| --- | --- | --- |
| 1,589,349 | Bausch et al. | June 22, 1926 |
| 1,601,886 | Schufftan | Oct. 5, 1926 |
| 1,821,626 | Fleischer | Sept. 1, 1931 |
| 1,934,582 | Bausch et al. | Nov. 7, 1933 |
| 1,996,920 | Hauser | Apr. 9, 1935 |
| 2,053,073 | Gardner | Sept. 1, 1936 |
| 2,064,368 | Bausch et al. | Dec. 15, 1936 |
| 2,192,529 | Thomas et al. | Mar. 5, 1940 |
| 2,221,154 | Soper | Nov. 12, 1940 |
| 2,258,382 | Goebel | Oct. 7, 1941 |
| 2,261,772 | Longfellow | Nov. 4, 1941 |
| 2,266,741 | Crane et al. | Dec. 23, 1941 |
| 2,310,273 | Bancroft | Feb. 9, 1943 |
| 2,363,700 | Soetbeer | Nov. 28, 1944 |
| 2,373,929 | Turrenttini | Apr. 17, 1945 |

FOREIGN PATENTS

| Number | Country | Date |
| --- | --- | --- |
| 7,154 | France | Mar. 19, 1907 |
| | (Addition to 372,231) | |